US009684305B2

(12) United States Patent
Kratz et al.

(10) Patent No.: US 9,684,305 B2
(45) Date of Patent: Jun. 20, 2017

(54) SYSTEM AND METHOD FOR MOBILE ROBOT TELEOPERATION (71) Applicant: FUJI XEROX CO., LTD., Tokyo (JP)

(72) Inventors: Sven Kratz, San Jose, CA (US); James L Vaughan, Sunnyvale, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/852,246

(22) Filed: Sep. 11, 2015

(65) Prior Publication Data
US 2017/0075348 A1 Mar. 16, 2017

(51) Int. Cl.
G05D 1/00 (2006.01)
G05D 1/02 (2006.01)

(52) U.S. Cl.
CPC ......... G05D 1/0038 (2013.01); G05D 1/0016 (2013.01); G05D 1/0044 (2013.01); G05D 1/024 (2013.01); Y10S 901/01 (2013.01); Y10S 901/47 (2013.01)

(58) Field of Classification Search
CPC .. G05D 1/0038; G05D 1/0016; G05D 1/0044; G05D 1/024; Y01S 901/01; Y01S 901/147
USPC .......................................................... 701/2
See application file for complete search history.

(56) References Cited

U.S. PATENT DOCUMENTS 5,204,814 A * 4/1993 Noonan ............... A01D 34/008
180/168
2013/0325244 A1* 12/2013 Wang .................... G05D 1/028
701/26

OTHER PUBLICATIONS

Baker, Michael, Robert Casey, Brenden Keyes, and Holly A. Yanco. 2004. "Improved Interfaces for Human-Robot Interaction in Urban Search and Rescue." In SMC (3), 2960-65.
Coltin, B., Biswas, J., Pomerleau, D., & Veloso, M. (2012). Effective semi-autonomous telepresence. Lecture Notes in Computer Science (including Subseries Lecture Notes in Artificial Intelligence and Lecture Notes in Bioinformatics), 7416 LNCS, 365-376.
Chronis, George, and Marjorie Skubic. 2003. "Sketch-Based Navigation for Mobile Robots." In Fuzzy Systems, 2003. FUZZ'03. The 12th IEEE International Conference on, 1:284-89. IEEE.
Jung et al. A Sketch-based Interface for Remote Robot Control on an Online Video Screen. ICCE 2013.
Kinect Hardware—https://www.microsoft.com/en-us/kinectforwindows/meetkinect/features.aspx—Retrieved Sep. 2015.

(Continued)

Primary Examiner — McDieunel Marc
Assistant Examiner — James E Stroud
(74) Attorney, Agent, or Firm — Procopio, Cory, Hargreaves & Savitch LLP (57) ABSTRACT Example implementations include a system and method for remotely controlling the motion of a robot. In example implementations, the user is presented with a display having video from a camera on the robot augmented with abstract sensor data, and facilitates the user to draw motion path commands directly on the camera view. Analysis of the scene for obstacles is performed, so that the drawing of commands is interactive, preventing the user from drawing impossible paths. The path sketch is then transformed into the coordinate system of the robot and used to generate commands that will move the robot to the desired location. Sensor data is also used to augment the camera view, in particular for highlighting dangers and obstacles.

18 Claims, 10 Drawing Sheets (56) References Cited

OTHER PUBLICATIONS

Lera, Francisco J., J. F. Garcia, and others. 2011. "Augmented Reality to Improve Teleoperation of Mobile Robots." In Workshop of Physical Agents, North America. http://robotica.unileon.es/~vmo/pubs/JoPhA-fjrl.pdf.

Maxwell, Bruce A., Nicolas Ward, and Frederick Heckel. 2003. "A Human-Robot Interface for Urban Search and Rescue." AAAI Mobile Robot Competition 3: 01.

Olivares, Roberto, Chen Zhou, Bobby Bodenheimer, and Julie A. Adams. "Interface Evaluation for Mobile Robot Teleoperation." In Proceedings of the ACM Southeast Conference (ACMSE03), 112:118, 2003.

Sakamoto, Daisuke, Koichiro Honda, Masahiko Inami, and Takeo Igarashi. "Sketch and Run: A Stroke-Based Interface for Home Robots." In Proceedings of the SIGCHI Conference on Human Factors in Computing Systems, 197-200. ACM, 2009. http://dl.acm.org/citation.cfm?id=1518733.

Wobbrock, J. O, A. D Wilson, and Y. Li. "Gestures without Libraries, Toolkits or Training: A $1 Recognizer for User Interface Prototypes." In Proceedings of the 20th Annual ACM Symposium on User Interface Software and Technology, 168, 2007.

Biehl, Jacob T., et al. "LoCo: a ready-to-deploy framework for efficient room localization using Wi-Fi." Proceedings of the 2014 ACM International Joint Conference on Pervasive and Ubiquitous Computing. ACM, 2014.

* cited by examiner

FIG. 2

FIG. 3(b) – Indication of impossible paths

FIG. 3(d) Obstacle detection and classification

FIG. 3(a) – Indication of Obstacle Proximity

FIG. 3(c) – Indication of path alternatives

SYSTEM AND METHOD FOR MOBILE ROBOT TELEOPERATION

BACKGROUND

Field

The present disclosure is directed generally to robot systems, and more specifically, to systems and methods of remotely controlling robot systems.

Related Art

In the related art, manual robot teleoperation (e.g., control) with a video feed, via keyboard or joystick can be a frustrating and tedious task. Such related art implementations may also be error prone. For example, latency in the reception of the video, even in small amounts, can lead to collisions between the robot and objects, as the actual path of the robots deviates from the path intended by the user, as a result of the latency.

The related art methods for autonomous localization and navigation include using a map generated through simultaneous localization and mapping techniques, and localizing within the map with the use of laser scanners or beacons. However, these related art techniques can require an investment in time and updates as the environment changes or changes in the preference of the user of the robot. Thus, the autonomous related approaches may not be as reliable as human teleoperation.

SUMMARY

Example implementations involve a system and method for remotely controlling the motion of a robot. In this system, the user is presented with a display that can include video from a camera on the robot, augmented with abstract sensor data. The system facilitates the user to draw motion path commands directly on the robot's camera view. Analysis of the scene for obstacles is performed, so that the drawing of commands is interactive, preventing the user from drawing impossible paths. The path sketch is transformed into the robot's coordinate system and used to generate commands that will move the robot to the desired location. Sensor data is also used to augment the camera view, in particular for highlighting dangers and obstacles.

Although overlay systems are known in the related art, such related art overlay systems overlay information related to the robot on the camera navigation view, but cannot incorporate navigation or planning tasks for navigation.

Aspects of the present disclosure include a first apparatus configured to navigate a movable second apparatus. The first apparatus can include a display; and a processor, configured to process a proposed navigation path for the movable second apparatus; and for the proposed navigation path having at least one portion intersecting an obstacle identified from sensor data from the movable second apparatus, display an alternate navigation path on the display, the alternate navigation path having highlighted one or more portions of the alternate navigation path that differ from the proposed navigation path.

Additional aspects of the present disclosure include a method, which can involve processing a proposed navigation path for a movable apparatus; and for the proposed navigation path having at least one portion intersecting an obstacle identified from sensor data from the movable apparatus, displaying an alternate navigation path on a display, the alternate navigation path having highlighted one or more portions of the alternate navigation path that differ from the proposed navigation path.

Additional aspects of the present disclosure include a non-transitory computer readable medium, storing instructions for executing a process. The instructions can include processing a proposed navigation path for a movable apparatus; and for the proposed navigation path having at least one portion intersecting an obstacle identified from sensor data from the movable apparatus, display an alternate navigation path on a display, the alternate navigation path having highlighted one or more portions of the alternate navigation path that differ from the proposed navigation path.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application. Further, although example implementations as described herein are described in context of a movable robot, the example implementations can apply to any movable apparatus (e.g., remote control car) and are not limited to a robot.

Example implementations involve systems and methods that may not require a priori knowledge of the environment in which the robot operates. In example implementations, live sensor data from a sensor of the robot is utilized to allow automatic operation of the robot within its immediate surroundings and for real-time augmentation of the camera user view that is used for navigation. For instance, example implementations can facilitate the selection of robot navigation goals through the 2D camera feed from the onboard camera. Example implementations can also process drawing input on the floor as displayed on a display. The floor plane of the robot can be detected by the robot sensors as described below.

Example implementations of the present disclosure involve a navigation user interface (UI) that makes use of obstacle detection information (e.g., information gathered via the sensors of the robot) and path planning information (e.g. generated through local navigation algorithms). The obstacle detection information and path planning information may be hidden from the user. This hidden information can be utilized to augment human skill in providing input for robot teleoperation tasks via the UI, when the hidden information is conveyed to a user in a way that guide the user to avoid obstacles. Example implementations involve visualizing the information to the user (1) by describing methods of how detected obstacles can be visualized in a live camera feed from the robot, and (2) by describing how local path planning can be visualized and made interactive in a user interface based on a live camera feed from the robot.

Related art UIs for mobile robot teleoperation rely on a two dimensional (2D) camera feed that show the user a view oriented in the robot's forward direction of motion. This view comes from a statically mounted camera on the robot, with a limited field of view. This mounting configuration can result in a reduction of situational awareness for the user during navigation tasks. Furthermore, latency can make it difficult to control the robot at speeds associated with the practical operation of the robot, which can greatly reduce the practical applications for which the robot can be applied while operating the robot through a related art User Interface (UI) by joystick, mouse or keyboard, or touch screen.

In example implementations, the 2D camera view is utilized as an active part of the UI for robot's teleoperation. Rather than entering direct movement commands via an input device such as a (software) joystick, mouse, keyboard or touch screen as is done in the related art, example implementations facilitate the user to interact with the 2D camera in a "reach through the screen" fashion, where the user can interact directly with the display provided by the 2D camera. Using the on-board sensors of the robot, objects of interest in the environment that are relevant to controlling the robot can be highlighted in the UI.

Related art implementations include robot control via sketch inputs on a screen interface. However, such related art systems are directed to a top-down abstraction of the operating environment of the robot, and do not include sensor feed, such as live camera views. For related art implementations involving navigation of a robot by camera, there are related art systems which allow specific points to be selected by an input device such as a mouse. However, the related art implementations do not facilitate path-drawing so as to permit the drawn path to be analyzed for obstacle proximity to the robot. Further, by registering robot path drawings with the live camera feed in the example implementations, the user can be provided with a more direct and natural way of interacting with the robot through the camera of the robot in contrast to the related art approaches, and can allow the user to be more visually aware of the surroundings of the robot.

Thus, in example implementations, the camera view of the robot can be used as the main user interface component for robot navigation. Such implementations can render other UI widgets such as arrow buttons to be unnecessary. As standard related art UI widgets such as arrow buttons or soft joysticks tend to perform rather poorly for manual robot teleoperation, the example implementations can improve usability by providing flexible path sketching interfaces. Through path sketching implementations as described herein, the robot motion can be preplanned so no direct control by the user is necessary. Such implementations can thereby compensate for the inherent lag in the camera feed of the robot, as well as for the time needed to send motion commands to the robot. Thus, the combination of autonomous approaches and interfaces for human teleoperation in the example implementations described below may address the issues of the approaches of the related art.

Figure 1:
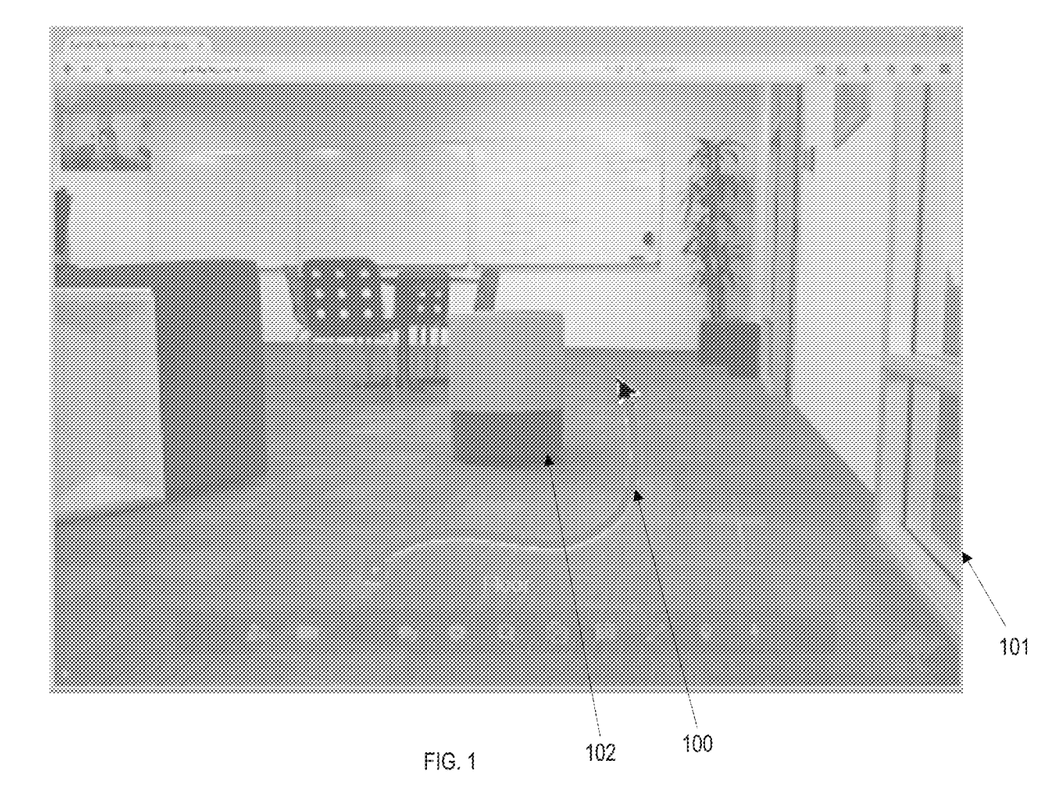
FIG. 1 illustrates a user-specified path for a movable apparatus, in accordance with an example implementation.

FIG. 1 illustrates a user-specified path for a movable apparatus, in accordance with an example implementation. The path 100 is sketched onto the camera view 101 by the user. This path 100 is then followed by the mobile robot to navigate around obstacle 102. Instead of sending explicit movement commands to the robot throughout the course of movement by the user (e.g., each time the robot needs to make a change in movement), the user can sketch the desired path in the augmented navigation view. The robot will then proceed to navigate (i.e., move along) the path that was sketched by the user. In the example implementation of FIG. 1, the navigation is performed within the local coordinate system of the robot, and requires no global localization (e.g., identifying the location of the robot through external methods such as GPS or other tracking devices) or construction of maps of the environment through which the robot is to navigate.

However, camera-based navigation views may be insufficient at conveying distance information to robot operators that may be remote from the robot. Distance information can be useful for obstacle detection and avoidance (e.g., safety, and timely completion of the goal's of the operation of the robot). Thus, mobile robots can be equipped with other sensors (e.g., depth cameras or laser range finders) to generate sensor data that can be used to gather distance information in the environment of the robot. The types of sensors that may be employed is not limited to those enumerated herein, and other sensors may be employed without departing from the inventive scope of the example implementation.

Figure 2:
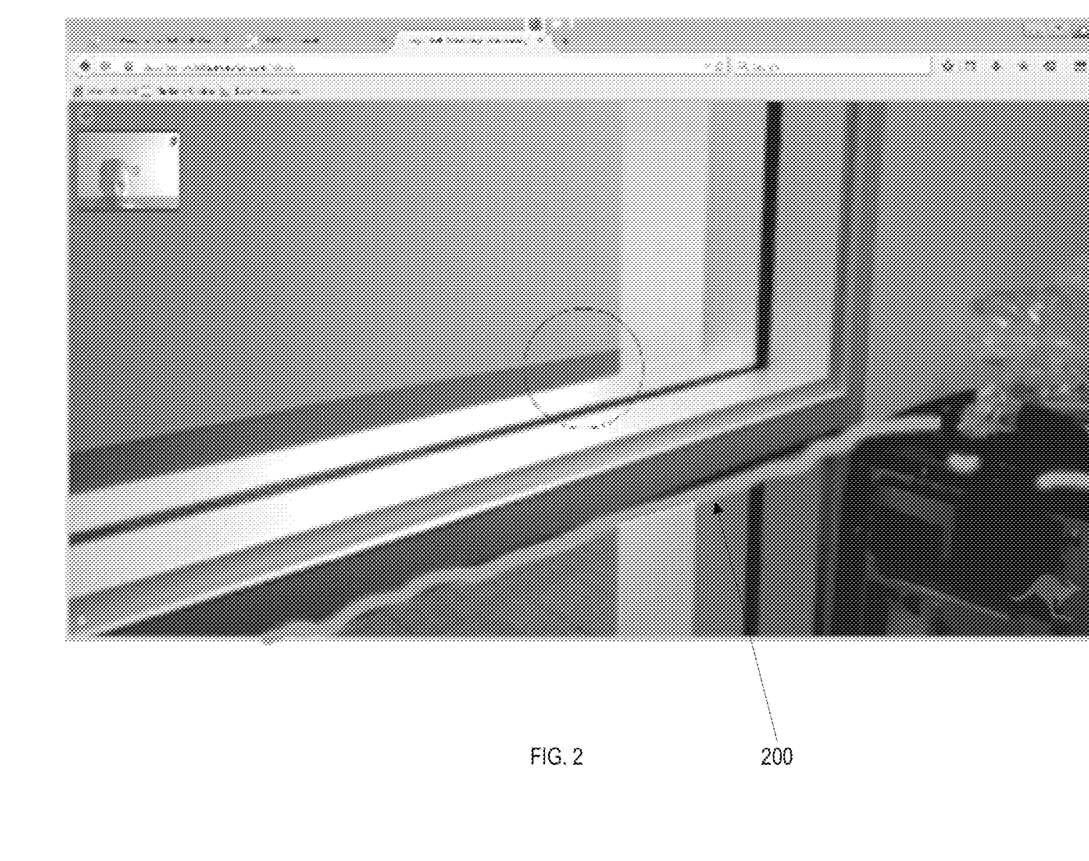
FIG. 2 illustrates an example of presenting sensor information in the augmented camera navigation view, in accordance with an example implementation.

FIG. 2 illustrates an example of presenting sensor information in the augmented camera navigation view, in accordance with an example implementation. In the example of FIG. 2, laser range finders (i.e., sensors that measure distance based on the projected laser) are overlaid onto the camera navigation view so that the camera navigation view is augmented with sensor data 200. Such overlaying of sensor information can facilitate making sensor information (e.g., as provided by laser range finders) immediately visible and correctly mapped to what the user is being provided (e.g., seeing) in the camera view. Although related art implementations have included representations of the robots having laser range finder sensor data in the teleoperation user interface, the related art does not utilize such overlays to display sensor information in the coordinate system of the camera. In other words, by utilizing laser range finder sensor data directly on the 2D camera view, the user may thereby be provided with more accurate information regarding the surroundings of the robot.

In the example implementation of FIG. 2, a LIDAR laser scanner is used to provide data for obstacle avoidance. FIG. 2 illustrates the raw sensor data 200 from the sensor projected into the coordinate system of the camera. While humans may be able to interpret the spatial content of 2D images quickly, the laser scan can help the user to disambiguate scenes that are difficult to process, such as scenes or environments with poor lighting. The example implementation can also be extended to include post-processing, such as detection of line segments within the scan data to determine the borders of potential objects.

FIGS. 3(a) to 3(d) illustrate augmenting the visual representation of the robot path, in accordance with an example implementation. Using sensor data gathered from the environment, the visual representation of the robot path may be augmented. For instance, the UI may render segments of the path in different colors, patterns, and/or highlighting to differentiate between segments of the robot path that the robot can navigate to freely, segments near potential obstacles, and segments that the robot cannot navigate to due to obstruction. This provides a visual representation that can quickly guide the user to the portions of the path that may require modification due to proximity to the potential obstacles, or obstruction.

Figure 3A:
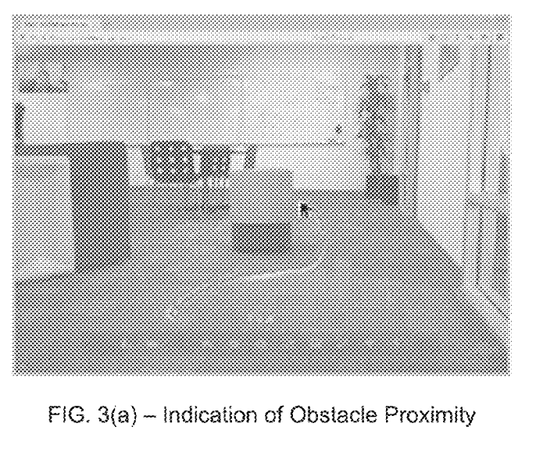
FIGS. 3(a), 3(b), 3(c) and 3(d) illustrate augmenting the visual representation of the robot path, in accordance with an example implementation.
Figure 3B:
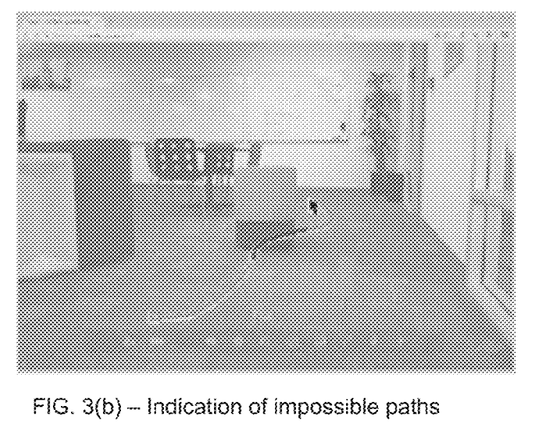

In FIG. 3(a) additional highlighting is provided to indicate portions of the path that are in proximity to an identified one or more obstacles. The determination of what portions to highlight on the path can depend on a threshold set by the user of the interface (e.g., highlight path portions within a prescribed distance from the obstacle, such as one width of the robot), whereupon the UI can identify obstacles in the camera view and highlight the path portions that fall within the threshold relative to an identified one or more obstacles. In FIG. 3(b), additional highlighting is provided to indicate portions of the path that are impossible for navigation (e.g., path would cause the robot to collide with identified one or more obstacles).

There are cases where it can be impossible for the navigation software of the robot to exactly match the desired path of the user (e.g., due to path colliding with identified one or more obstacles as illustrated in FIG. 3(b)). However, in such circumstances it can still be possible for the system to determine one or multiple alternative paths to the desired endpoint of the user, and provide this information to the user. Thus, an amended version of the path provided by the user can be shown in the augmented camera window. A juxtaposition of the amended path and the original path could also be shown, which is provided in FIG. 3(c).

Figure 3C:
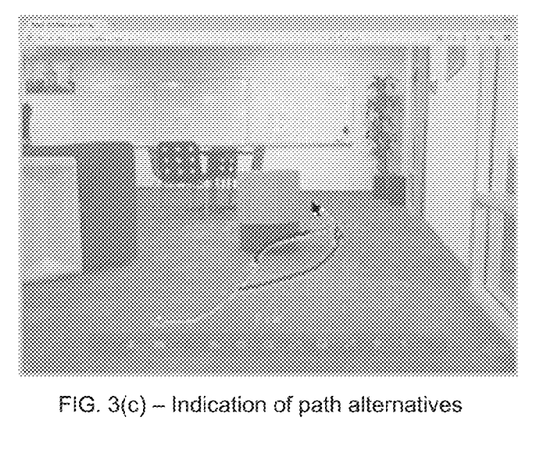

In another example implementation, when the user attempts to execute an invalid path, the interface can be configured to not accept the path, and provide a suggested alternate path. In the example of FIG. 3(b), when the user attempts to execute the path, the interface may refuse the command and provide a suggestion as illustrated in FIG. 3(c). In other example implementations, the interface may indicate to the user that a new path needs to be drawn. In other example implementations, a rubber banding approach can be applied as the user approaches the obstacle on the composite of the path drawing, which causes the drawn path to automatically rubber band around the pathway. Rubber banding is the process of automatically maintaining a predefined input constraint (e.g., distance from an obstacle), regardless of the user's actions. The rubber banding can be based on a threshold minimum distance between the robot and the obstacle, which can be utilized for the basis of the amended path.

Figure 3D:
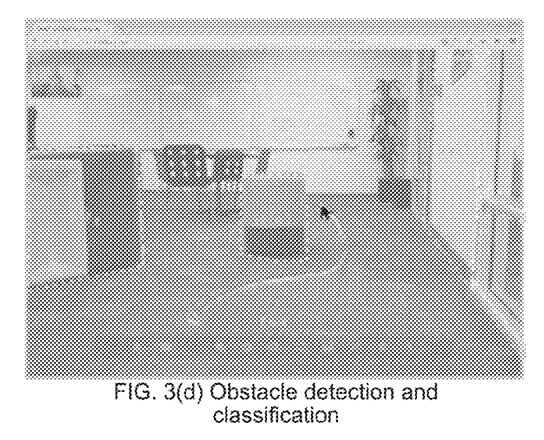

Furthermore, distance information gathered through the sensors of the mobile robot can be used in the augmented camera navigation view to highlight potential obstacles or zones where robot operation may not be possible, such as spaces that are too narrow to fit the robot, the start of staircases, or areas of poor signal reception. Obstacle detection and classification (e.g., using 3D point cloud information) can also be used to highlight different classes of obstacles in the environment such as doors, furniture or persons. FIG. 3(d) illustrates an example camera view with identified obstacles highlighted and classified, in accordance with an example implementation.

In example implementations, an RGBD camera can be attached to the robot to provide color and depth images. From the depth image, the planes in the scene can be detected with a random sample consensus (RANSAC) approach, however, other approaches (e.g. Eigen analysis) may also be applied depending on the desired implementation, and the present disclosure is not limited thereto. Since the pose of the camera relative to the robot is known, the floor plane can therefore be identified. Such example implementations facilitate a user specified path to be verified, and modified, as shown in FIG. 3(c). Once the floor plane is identified, other large planar objects in the scene can be assumed to be walls. The remaining objects can be segmented and classified, which can provide the augmented view in FIG. 3(d). Further, RGBD cameras may include a software framework that allows for the detection of humans, which can also be used for highlighting and obstacle avoidance.

In example implementations, stroke dynamics can also be utilized to issue commands, which can include the analysis of stroke properties such as speed, acceleration, and so on. Such stroke dynamics could be used to determine, for example, the speed at which the mobile robot will navigate the stroked path. In example implementations for mapping stroke dynamics to path planning, stroke speed or acceleration is mapped to an obstacle avoidance tolerance of the path planning. For instance, a slow stroke (which may be drawn more precisely by the user) could allow the robot to travel closer to obstacles, while a fast stroke (which may be less precise) can have the effect of the robot leaving wider distances between itself and obstacles.

In addition to the stroke dynamics, velocity and acceleration properties can be associated with various portions of the drawn path. In such an example implementation, for portions of the pathway that are within the threshold distance of an obstacle, the robot may be configured to navigate slower during such portions of the path and also reduce acceleration before reaching such portions on the path, regardless of the user stroke input. For portions of the path that are not near obstacles, the robot may be configured to navigate at a different velocity and acceleration from the portions of the path that are near the obstacle, based on the stroke and associated velocity and acceleration.

Other example implementations of the interface can include receiving an input for an endpoint to the destination, whereupon the interface will determine a path based on the locations of the detected and identified obstacles. Such implementations can generate and evaluate a set of different paths generated by any method known in the art, and then select one based on a desired metric, or present the paths to the user for selection. In such example implementations, a cost map of the floor plane can be utilized for evaluating the paths based on the desired metric.

Figure 4:
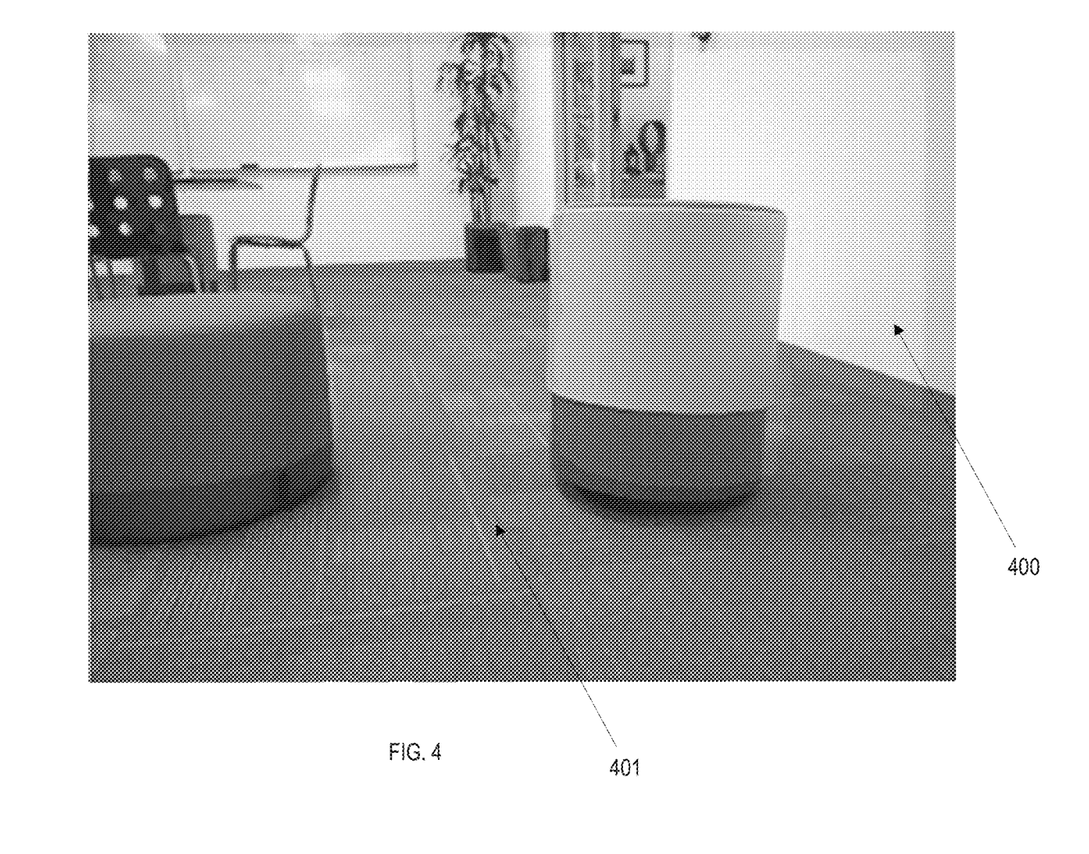
FIG. 4 illustrates an example camera view from an RGBD (red, green, blue+depth) sensor, in accordance with an example implementation.

FIG. 4 illustrates an example camera view from an RGBD sensor, in accordance with an example implementation. In the example implementation, a software framework is used to conduct obstacle highlighting 400 in the camera live feed. Further, example implementations include floor plane segmentation and normal analysis of a point cloud obtained from an RGBD sensor. For output in the 2D camera navigation view, the location coordinates of the points classified as floor or obstacle are transformed from their 3D location in the point cloud to their corresponding 2D coordinates in the RGB image used for robot navigation. In the example of FIG. 4, the floor 401 is highlighted differently from obstacles and walls 400 through the use of example implementations. The classification of floor versus obstacle (e.g., wall, chair) can be derived from the color and depth information from the RGBD sensor, wherein a plane can be derived for the floor. Once the plane for the floor is derived, in an example implementation, everything that is above the plane can be considered as an obstacle and objects below the plane can be further detected and identified as another type of obstacle (e.g., stairwell, hole). Thus, in example implementations, obstacles can be derived by segmenting detected objects that are offset from the plane of the floor.

As the robot progresses along the path specified by the user, features from the RGB and depth image are extracted to determine the updated position of the robot, and the path verification process can be repeated to determine if the current path is still valid based on recursive object and floor plane detection as described above. In such an example implementation, the updates can be manifested in the UI as an updating path, which may change as new obstacles are detected. This form of navigation can be self-contained, and does not need to rely on the global localization of the robot.

Figure 5:
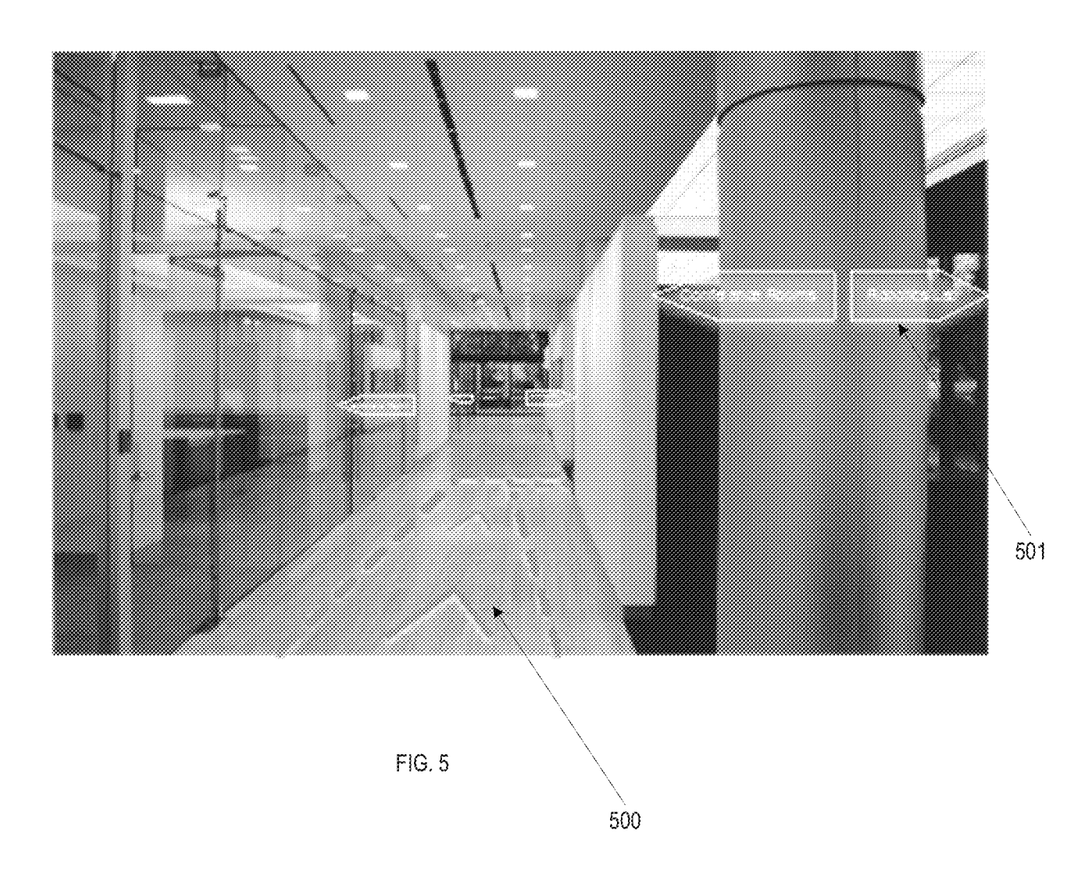
FIG. 5 illustrates an example of overlaying the navigation camera view with global path planning assistance and POI markers, in accordance with an example implementation.

However, in example implementations, if the mobile robot has the capability of locating itself in the global environment (i.e., global localization), it is also possible to overlay relevant (global) contextual information on the augmented camera navigation view. Examples of such information could be virtual room labels, direction indicators to points of interest (POI) or route guidance indicators to the desired destination of the user as illustrated in FIG. 5. Thus in example implementations, if there is a localization system in place, so that the position of the robot can be determined within a map, then points of interest can be highlighted in the 2D user interface, as shown in FIG. 5.

FIG. 5 illustrates an example of overlaying the navigation camera view with global path planning assistance 500 and POI markers 501, in accordance with an example implementation. The labels in such an augmented view could also be made interactive. For example, when the user selects the "Robotics Lab" label 501 as illustrated in FIG. 5, the robot could either initiate autonomous navigation towards that target, orient itself in the best heading to reach that target, or update the path planning overlay to guide the user towards that new destination.

In addition to drawing augmented reality (AR) overlays on static objects known in a global positioning context, example implementations also facilitate the drawing of AR overlays on movable (e.g., mobile) objects. In this case, a combination of global localization and local object detection can be utilized. In this manner, metadata can be generated for overlays on movable objects of a particular type (e.g., through point cloud registration or some other specific geometric or visual description of an object) of in a space that is constrained through position information obtained via global localization.

In the related art implementations of augmented reality for camera navigation views, fiducials (e.g., markers) placed in the environment are identified, whereupon AR content is overlaid at the detected location of the markers. However, in example implementations, the localization of the robot is utilized to determine the display location of the overlay content, instead of relying on physical markers in the environment as in the related art. In such an example implementation, the detection and identification of certain obstacles that are known based on the map location can be utilized to overlay content. For example, a detected and identified column in a room from the sensor data and the localization information can have a corresponding overlay placed on the navigation camera view, which avoids the need to around putting physical visual tags in the environment for overlaying AR information as in the related art implementation.

Further visualization of sensor data can be added to the navigation view of the robot as a complement to sketch-based motion entry. Although augmenting the camera view has been proposed in related art systems, such systems do not utilize direct sensor measurements, e.g., from a laser line scanner having been visualized directly in the robot's camera view and augmented content having been displayed in the camera of the robot based on location information provided by the localization system of the robot.

Figure 6A:
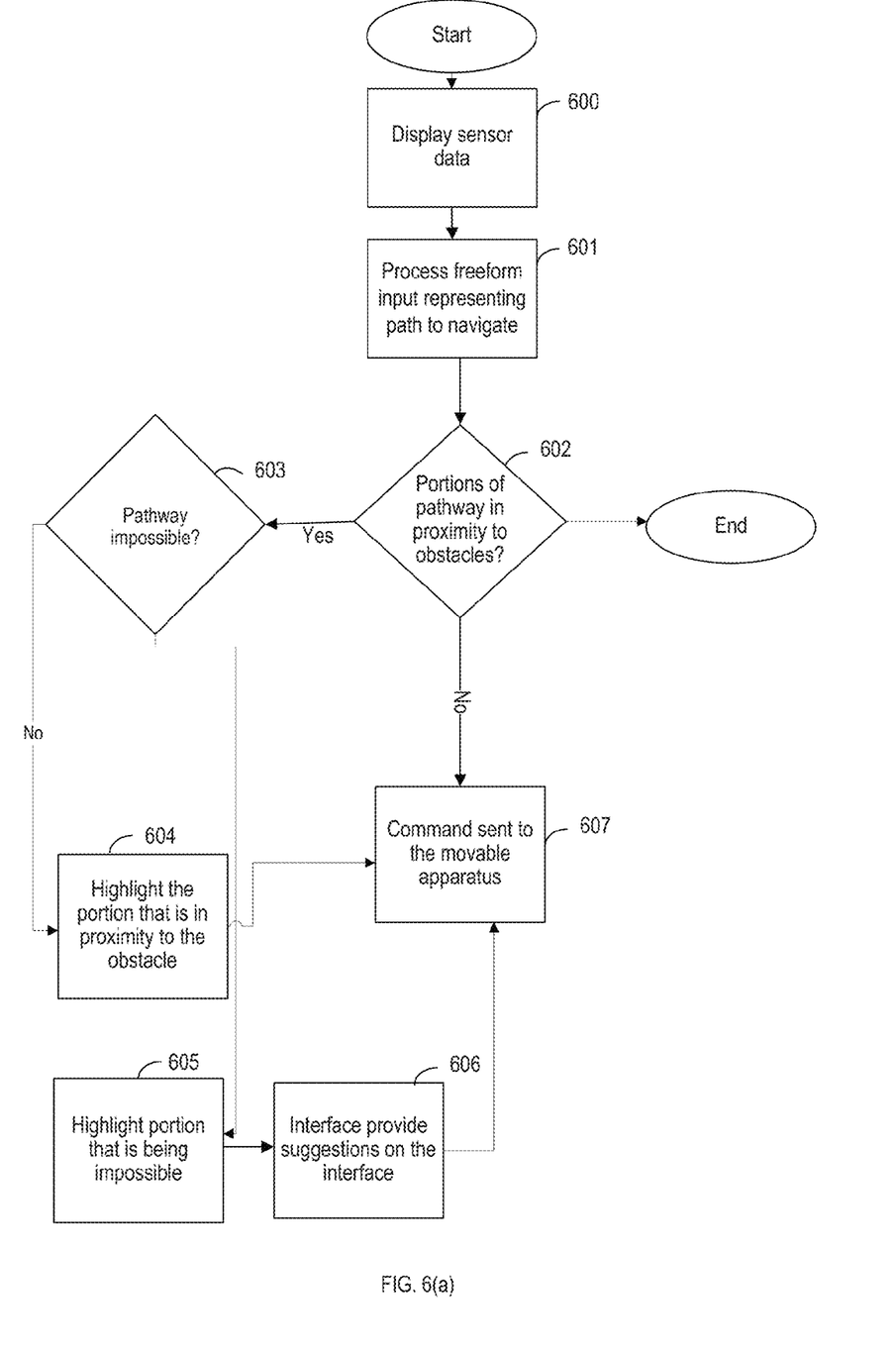
FIGS. 6(a) and 6(b) illustrate flow diagrams for the interface, in accordance with an example implementation.

FIG. 6(a) illustrates a flow diagram for the interface, in accordance with an example implementation. At 600, sensor data is displayed on a display. Such sensor data can include a navigation camera image view to present a 2D image of data detected by the camera, and/or can also include RGBD data, laser line scan or other sensor data of the robot. At 601, the user provides an input (e.g., places or makes a stroke or gesture on the interface) to input a freeform path that describes the desired robot navigation path. The user can input navigation path strokes directly on the 2D camera image shown in the user interface. At 602, the interface processes the pathway for detecting portions of the path that are in proximity to identified obstacles. In order to determine object proximity to the input navigation stroke path, the input stroke is transformed from the camera's coordinate system to the robot's local coordinate system. If the pathway is in proximity to an obstacle (Yes) then the flow proceeds to 603 to determine if the pathway is impossible. If so (Yes), then the flow proceeds to 605 to highlight the portion as being impossible to navigate as the pathway is traversing through an obstacle. Otherwise (No), the flow proceeds to 604 to highlight the portion that is in proximity to the obstacle but otherwise still navigable. At 606, the interface can then provide suggestions on the interface (e.g. alternate paths or rubber banding to a suitable path), or can also direct the user to redraw the path. At 607, the final navigation path is transformed into movement commands for the movable apparatus.

Figure 6B:
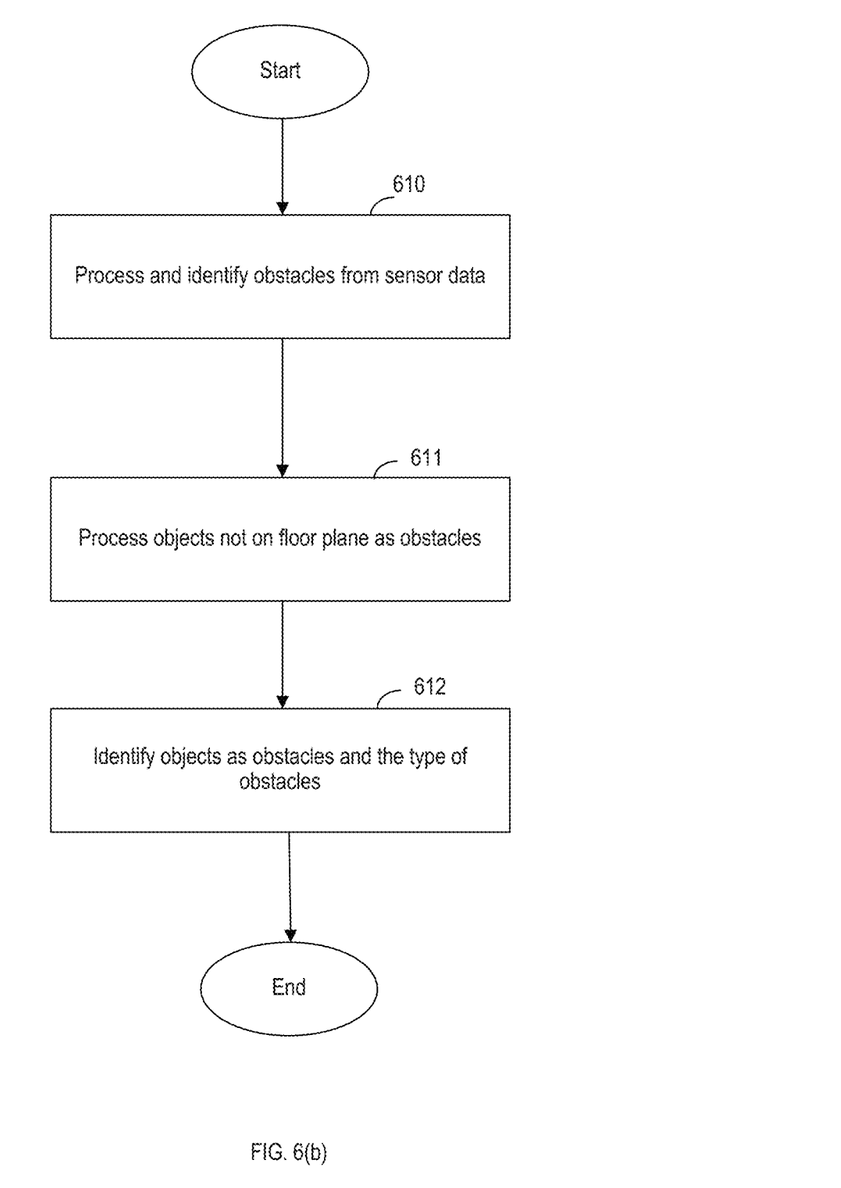

FIG. 6(b) illustrates a flow diagram to process and identify obstacles from the sensor data, in accordance with an example implementation. At 610, the interface receives the sensor data and processes the floor plane. The processing of the floor plane can be done with depth data, or can be identified from camera view data or other methods depending on the desired implementation as described above with respect to FIG. 4. At 611, the interface then processes objects not on the floor plane as obstacles. At 612, the interface then identifies the objects as obstacles and identifies the type of obstacles (e.g., wall, pillar, table if above the floor plane, hole or stairs on the bottom floor).

Figure 7:
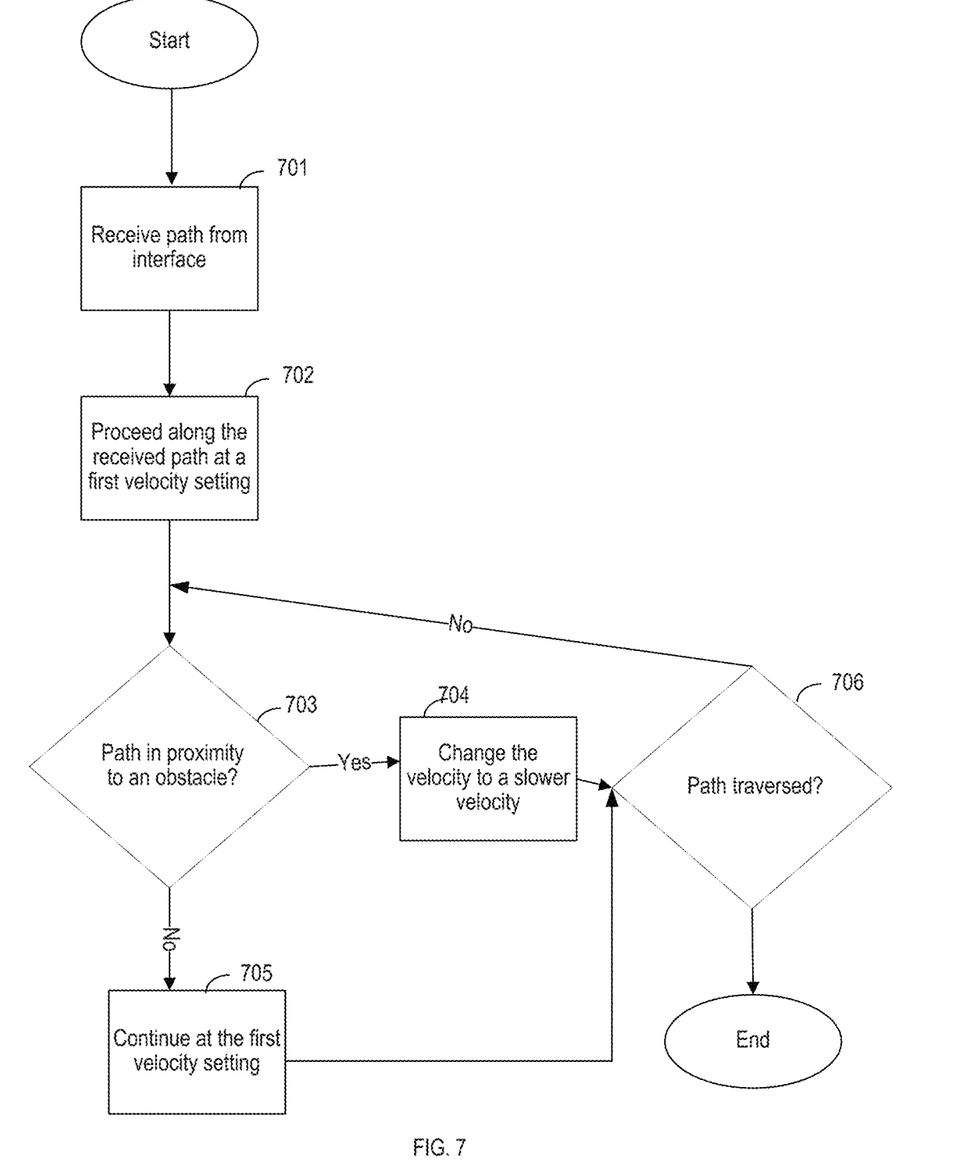
FIG. 7 illustrates an example flow diagram for the movable apparatus, in accordance with an example implementation.

FIG. 7 illustrates an example flow diagram for the movable apparatus, in accordance with an example implementation. At 701, the movable apparatus receives the path from the interface, and transforms it into platform-specific movement commands. At 702, the movable apparatus proceeds along the received path at a first velocity setting. At 703, the movable apparatus determines if it is along a part of the path that was marked as being in proximity to an obstacle, or if it detects, using on-board sensors, an obstacle in proximity to the movable apparatus within a threshold. If so (Yes), then the flow proceeds to 704 to change the velocity to a slower velocity. As an alternative to a fixed slower velocity, the velocity reduction can be set proportional to the distance between the mobile apparatus and the closest obstacle. Otherwise (No), then the flow proceeds to 705 to continue at the first velocity setting. At 706, the loop repeats until the path has been traversed, whereupon the flow ends until another path is received.

Figure 8:
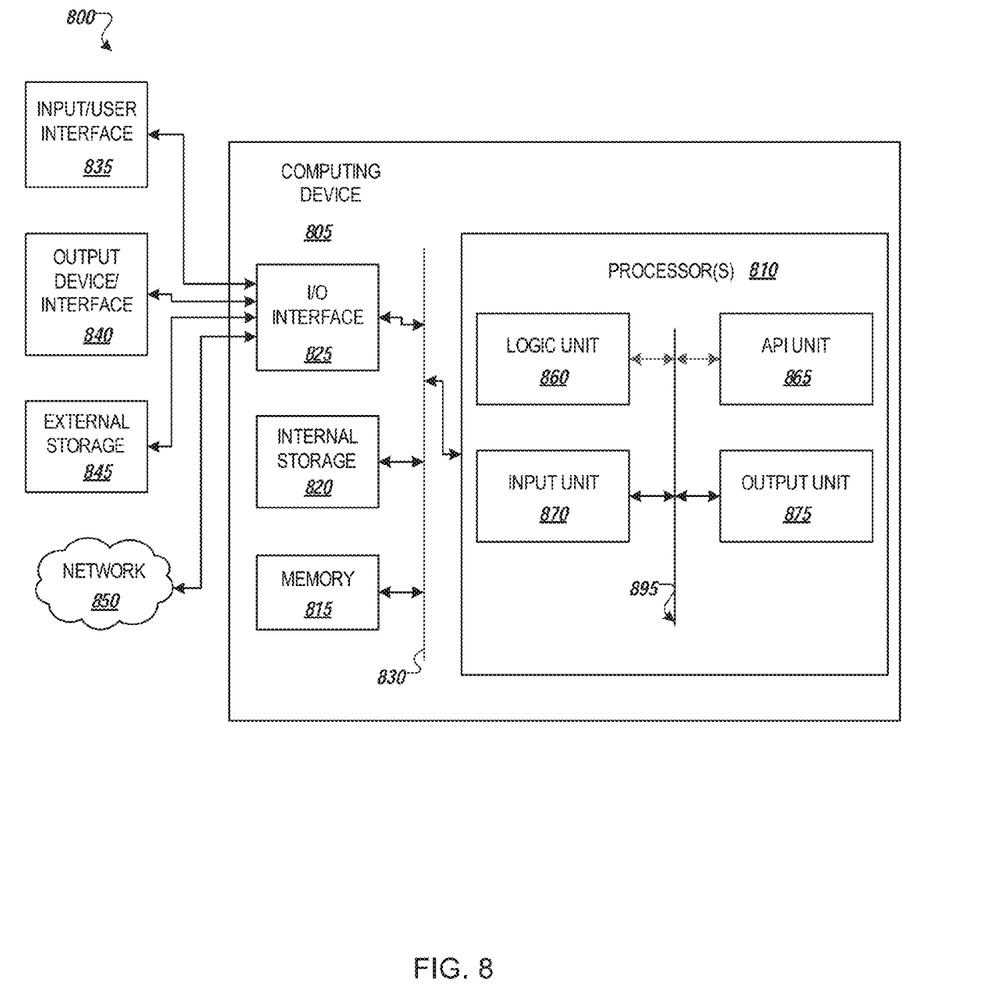
FIG. 8 illustrates an example computing environment with an example computer device suitable for use in some example implementations, such as an apparatus to facilitate the functionality of navigating another movable apparatus.

FIG. 8 illustrates an example computing environment with an example computer device suitable for use in some example implementations, such as an apparatus to facilitate the functionality of navigating another movable apparatus. Computer device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computer device 805.

Computer device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computer device 805. In other example implementations, other computer devices may function as or provide the functions of input/user interface 835 and output device/interface 840 for a computer device 805.

Examples of computer device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 805 can be communicatively coupled (e.g., via I/O interface 825) to external storage 845 and network 850 for communicating with any number of networked components, devices, and systems, including one or more computer devices of the same or different configuration. Computer device 805 or any connected computer device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computer device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, and inter-unit communication mechanism 895 for the different units to communicate with each other, with the OS, and with other applications (not shown). The described units and elements can be varied in design, function, configuration, or implementation and are not limited to the descriptions provided.

In some example implementations, when information or an execution instruction is received by API unit 865, it may be communicated to one or more other units (e.g., logic unit 860, input unit 870, output unit 875). In some instances, logic unit 860 may be configured to control the information flow among the units and direct the services provided by API unit 865, input unit 870, output unit 875, in some example implementations described above. For example, the flow of one or more processes or implementations may be controlled by logic unit 860 alone or in conjunction with API unit 865. The input unit 870 may be configured to obtain input for the calculations described in the example implementations, and the output unit 875 may be configured to provide output based on the calculations described in example implementations.

Processor(s) 810 can be configured to process a proposed navigation path for the movable apparatus, such as a robot, in accordance with the flow diagrams of FIGS. 6(a) and 6(b), to determine any portions of the proposed navigation path that intersect an obstacle identified from sensor data from the movable apparatus. Should such portions exist, processor(s) 810 can cause output device 840 to highlight such portions as well as display an alternate navigation path that also includes highlighting on portions of the alternate navigation path that differ from the proposed navigation path. Processor(s) 810 can also be configured to highlight portions of the proposed navigation path that are within a proximity threshold of the identified one or more obstacles. The proximity threshold can be a factory setting of the movable apparatus, or can be set by the operator of the interface through input/user interface 835.

Processor(s) 810 can also be configured to cause the output device 840 to display the proposed navigation path overlaid on visual data from the movable apparatus. Processor(s) 810 is configured to utilize I/O interface 825 to transmit instructions to the movable apparatus to navigate the proposed navigation path at a first velocity, and to navigate the highlighted portions of the proposed navigation path at a second velocity different from the first velocity. The velocities can be slower for the highlighted portions due to proximity of obstacles. These velocities can be a factory setting of the movable apparatus or can be set by the operator of the interface through input/user interface 835, and can be in the form of a mapping function relating velocity to distance from the identified one or more obstacles (e.g., velocity decreases as movable apparatus is closer in proximity to the obstacle). Processor(s) 810 can also be configured to apply highlighting to portions of the proposed navigation path that intersect the identified one or more obstacles as well as the identified one or more obstacles itself. For further identification of obstacles, the processor(s) 810 can also be configured to retrieve one or more overlays to overlay on visual data from the movable apparatus, based on a location of the movable apparatus and the identified one or more obstacles. Location information, such as information related to the location of the movable apparatus within a building, can be applied to identify obstacles as particular objects (e.g., pillar, wall, chair, etc.) and can also be used to place overlays to guide the operator to a desired room or location.

Figure 9:
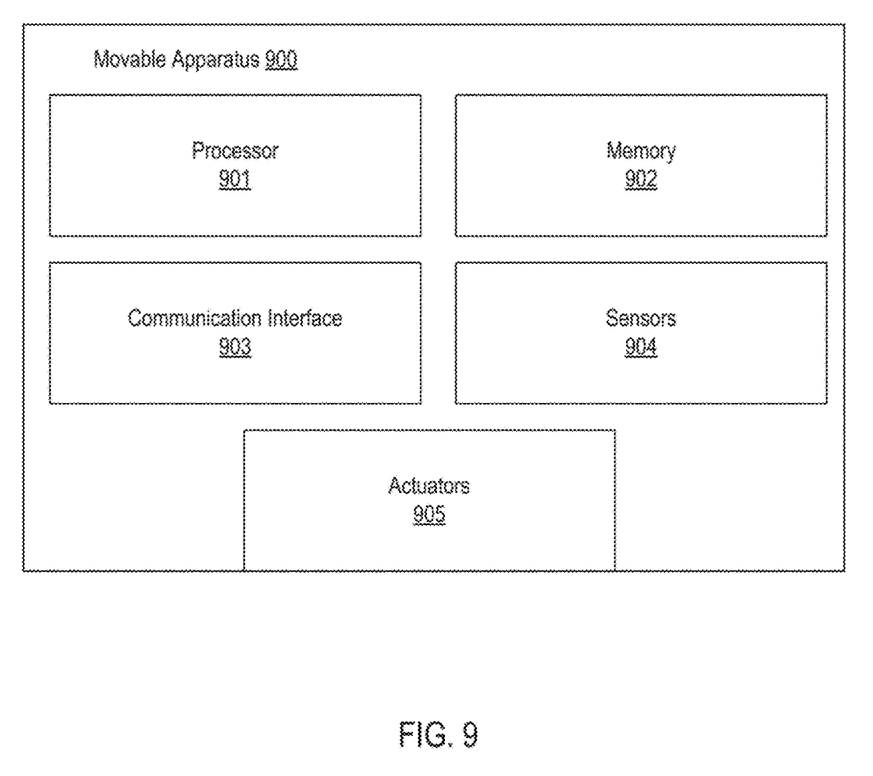
FIG. 9 illustrates an example hardware diagram for a movable apparatus, in accordance with an example implementation.

FIG. 9 illustrates an example hardware diagram for a movable apparatus, in accordance with an example implementation. The movable apparatus 900 may include a processor 901, a memory 902, a communication interface with a baseband processor 903, one or more sensors 904, and one or more actuators 905. Memory 902 may store instructions that can be loaded into processor 901 to execute the flow diagram as illustrated, for example, in FIG. 7. Communication interface 903 may be configured to receive instructions from the interface as illustrated in FIGS. 6(a) and 6(b) and store the instructions into memory 902 for execution by the processor. Sensors 904 can include cameras, RGBD sensors, lasers and other sensors that gather sensor data to send back to the interface through the communication interface 903. Actuators 905 can be configured to navigate and move the movable apparatus 900.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A first apparatus configured to remotely control a movable second apparatus, the first apparatus comprising:
   a display; and
   a processor, configured to:
      receive a proposed navigation path for the movable second apparatus;
      identify one or more obstacles from sensor data provided by the movable second apparatus;
      determine that the proposed navigation path has at least one portion intersecting the identified one or more obstacles; and
      provide to the display an alternate navigation path comprising one or more highlighted portions that differ from the proposed navigation path;
      wherein the processor is configured to transmit instructions to the movable second apparatus, the instructions comprising navigating the proposed navigation path at a velocity based on a mapping function relating velocity to distance from the identified one or more obstacles.

2. The first apparatus of claim 1, wherein the display is configured to display the proposed navigation path overlaid on visual data received from the movable second apparatus, and wherein the processor is configured to highlight, on the display, one or more portions of the proposed navigation path that are within a proximity threshold of the identified one or more obstacles.

3. The first apparatus of claim 1, wherein the display is configured to display the proposed navigation path overlaid on visual data received from the movable second apparatus, and wherein the processor is configured to highlight, on the display, one or more portions of the proposed navigation path that intersect the identified one or more obstacles.

4. The first apparatus of claim 1, wherein the processor is configured to highlight the identified one or more obstacles on the display.

5. The first apparatus of claim 1, wherein the processor is configured to retrieve one or more overlays to overlay on visual data received from the movable second apparatus, based on a location of the movable second apparatus and the identified one or more obstacles.

6. A method, comprising:
receiving a proposed navigation path for a movable apparatus;
identifying one or more obstacles from sensor data provided by the movable apparatus;
determining that the proposed navigation path has at least one portion intersecting the identified one or more obstacles;
providing, on a display, an alternate navigation path comprising one or more highlighted portions that differ from the proposed navigation path; and
transmitting instructions to the movable apparatus, the instructions comprising navigating the proposed navigation path at a velocity based on a mapping function relating velocity to distance from the identified one or more obstacles.

7. The method of claim 6, further comprising overlaying, on the display, the proposed navigation path on visual data received from the movable apparatus, and highlighting, on the display, one or more portions of the proposed navigation path that are within a proximity threshold of the identified one or more obstacles.

8. The method of claim 6, further comprising overlaying, on the display, the proposed navigation path on visual data received from the movable apparatus, and highlighting, on the display, one or more portions of the proposed navigation path that intersect the identified one or more obstacles.

9. The method of claim 6, further comprising highlighting the identified one or more obstacles on the display.

10. The method of claim 6, further comprising retrieving one or more overlays to overlay on visual data from the movable apparatus, based on a location of the movable apparatus and the identified one or more obstacles.

11. A non-transitory computer readable medium, storing instructions for executing a process, the instructions comprising:
receiving a proposed navigation path for a movable apparatus;
identifying an obstacle from sensor data provided by the movable apparatus;
determining that the proposed navigation path has at least one portion intersecting the identified one or more obstacles;
providing, on a display, an alternate navigation path comprising one or more highlighted portions that differ from the proposed navigation path; and
transmitting instructions to the movable apparatus, the instructions comprising navigating the proposed navigation path at a velocity based on distance from the identified one or more obstacles.

12. The non-transitory computer readable medium of claim 11, wherein the instructions further comprise overlaying, on the display, the proposed navigation path on visual data received from the movable apparatus, and highlighting, on the display, one or more portions of the proposed navigation path that are within a proximity threshold of the identified one or more obstacles.

13. The non-transitory computer readable medium of claim 11, wherein the instructions further comprise overlaying, on the display, the proposed navigation path on visual data received from the movable apparatus, and highlighting, on the display, one or more portions of the proposed navigation path that intersect the identified one or more obstacles.

14. The non-transitory computer readable medium of claim 11, wherein the instructions comprise highlighting the identified one or more obstacles on the display.

15. The non-transitory computer readable medium of claim 11, wherein the instructions further comprise retrieving one or more overlays to overlay on visual data from the movable apparatus, based on a location of the movable apparatus and the identified one or more obstacles.

16. The non-transitory computer readable medium of claim 11, wherein the velocity based on a mapping function relating velocity to distance from the identified one or more obstacles is configured to conduct velocity reduction proportional to the distance from the identified one or more obstacles.

17. The non-transitory computer readable medium of claim 11, wherein the instructions further comprise overlaying the alternate navigation path on the proposed navigation path on the display.

18. The non-transitory computer readable medium of claim 11, wherein the velocity based on the distance is reduced as the movable apparatus is closer in proximity to the obstacle.

* * * * *